United States Patent
Draeger et al.

(10) Patent No.: US 11,125,280 B2
(45) Date of Patent: Sep. 21, 2021

(54) HYDRODYNAMIC FRICTION CLUTCH

(71) Applicant: Mahle International GmbH, Stuttgart (DE)

(72) Inventors: Jochen Draeger, Niefern (DE); Jens Langenstein, Vaihingen/Enz (DE); Gerold Schultheiss, Pforzheim (DE); Rudolf Stoklossa, Muhlacker (DE)

(73) Assignee: Mahle International GmbH

( * ) Notice: Subject to any disclaimer, the term of this patent is extended or adjusted under 35 U.S.C. 154(b) by 39 days.

(21) Appl. No.: 16/582,938

(22) Filed: Sep. 25, 2019

(65) Prior Publication Data

US 2020/0096056 A1    Mar. 26, 2020

(30) Foreign Application Priority Data

Sep. 26, 2018    (DE) .......................... 102018216478.9

(51) Int. Cl.
*F16D 35/02*    (2006.01)

(52) U.S. Cl.
CPC .... *F16D 35/021* (2013.01); *F16D 2500/1027* (2013.01); *F16D 2500/10406* (2013.01)

(58) Field of Classification Search
CPC ............... F16D 35/021–026; F16D 2500/1027
See application file for complete search history.

(56) References Cited

U.S. PATENT DOCUMENTS

| 4,004,668 | A | * | 1/1977 | Blair | ..................... | F16D 35/021 |
| | | | | | | 192/58.7 |
| 6,026,943 | A | * | 2/2000 | Fuchs | .................. | F16D 35/021 |
| | | | | | | 192/58.61 |
| 6,032,775 | A | | 3/2000 | Martin | | |
| 7,191,883 | B2 | | 3/2007 | Angermaier | | |
| 7,886,886 | B2 | | 2/2011 | Schultheiss et al. | | |

(Continued)

FOREIGN PATENT DOCUMENTS

| DE | 19742823 A1 | 4/1999 |
| DE | 10157822 A1 | 6/2003 |

(Continued)

OTHER PUBLICATIONS

English abstract EP-1391624.
English abstract for DE-102007046665.

*Primary Examiner* — Stacey A Fluhart
(74) *Attorney, Agent, or Firm* — Fishman Stewart PLLC (57) ABSTRACT

A hydrodynamic friction clutch may include a rotatably mounted shaft, a drive disc non-rotatably fixed on the shaft, and an output body rotatably fixed on the shaft. The drive disc may include a radially extending annular transmission region for receiving a viscous fluid and via which the drive disc may be couplable to the output body for transmitting a torque, and an annular segment-shaped storage chamber for receiving the viscous fluid. The transmission region may be fluidically connected to the storage chamber via an inlet path and a drainage path. In the inlet path, a closable valve opening for controlling the quantity of the viscous fluid in the transmission region may be provided. The inlet path may include an annular segment-shaped communication passage, which may fluidically connect the storage chamber to the valve opening. The drainage path may fluidically connect to the inlet path at the valve opening.

19 Claims, 8 Drawing Sheets

(56) References Cited

U.S. PATENT DOCUMENTS

| | | | |
|---|---|---|---|
| 2008/0257677 A1* | 10/2008 | Schultheiss | F16D 35/024 192/58.5 |
| 2015/0219168 A1* | 8/2015 | Kubota | F16D 35/024 192/58.5 |
| 2018/0274602 A1* | 9/2018 | Hennessy | F16D 35/005 |

FOREIGN PATENT DOCUMENTS

| | | |
|---|---|---|
| DE | 102007019088 A1 | 10/2008 |
| DE | 102007046665 A1 | 4/2009 |
| EP | 1391624 A1 | 2/2004 |
| WO | WO-2017/096202 A1 | 6/2017 |

* cited by examiner

HYDRODYNAMIC FRICTION CLUTCH

CROSS-REFERENCE TO RELATED APPLICATIONS

This application claims priority to German Patent Application No. DE 10 2018 216 478.9, filed on Sep. 26, 2018, the contents of which are hereby incorporated by reference in its entirety.

TECHNICAL FIELD

The invention relates to a hydrodynamic friction clutch, in particular for a motor vehicle fan.

BACKGROUND

A hydrodynamic friction clutch—also called viscous coupling—usually comprises a shaft, a drive element and an output element. The drive element is non-rotatably fixed on the shaft and transmits the torque to the output element, which is rotatably arranged on the shaft. For transmitting the torque, the drive element and the output element are coupled to one another by a viscous fluid—mostly oil. There, the viscous fluid is conveyed into a coupling region between the drive element and the output element so that the drive element and the output element are friction-coupled via the viscous fluid. If the output element is to be decoupled from the drive element, the fluid from the coupling region is conveyed into a storage chamber. The shaft is mechanically driven by the internal combustion engine and preferentially drive-connected directly to the crankshaft. Alternatively, the shaft can be driven by way of a belt drive. The output element can be for example a motor vehicle fan.

Such a hydrodynamic friction clutch is known for example from EP 1 391 624 A1. There, a storage chamber is provided in the drive element which makes possible a quick discharge of the viscous fluid from the storage chamber into the coupling region. In DE 10 2007 019 088 A1, special configurations of the storage chamber are described. The storage chamber and the coupling region are connected to one another via a pumping-off passage and via an inlet passage in the drive element, so that when the hydrodynamic friction clutch is switched on, the fluid flows via the inlet passage and an open valve bore into the coupling region. However, the fluid, at the same time, flows out of the coupling region via the pumping-off passage back into the storage chamber s that a residual quantity of the viscous fluid remains in the storage chamber. The residual quantity of the viscous fluid is dependent on the rotational speed of the drive element and increases with the same. The dynamic regulation of the hydrodynamic friction clutch is thereby rendered more difficult. Furthermore, the drive element with the storage chamber, with the internal combustion engine switched off, can also assume an unfavourable angle of rotation position in some rare cases, in which a part of the viscous fluid, because of the gravitational force, can enter the coupling region from the storage chamber. When the internal combustion engine is started, the hydrodynamic friction clutch is then already switched on and the output element—for example the motor vehicle fan—is undesirably co-rotated for a short time.

SUMMARY

The object of the invention therefore is to state an improved or at least alternative embodiment for a hydrodynamic friction clutch of the generic type, with which the described disadvantages are overcome. In particular, an undesirable coupling in the hydrodynamic friction clutch during the starting of the internal combustion engine is to be completely prevented. Furthermore, the dynamic regulation of the hydrodynamic friction clutch is to be improved and a faster engagement and disengagement of the hydrodynamic friction clutch made possible.

According to the invention, this object is solved through the subject of the independent claims. Advantageous embodiments are subject of the dependent claims.

A hydrodynamic friction clutch comprises a rotatably mounted shaft, a drive disc non-rotatably fixed on the shaft and an output body—in particular a motor vehicle fan—that is rotatably fixed on the shaft. Here, the drive disc comprises a radially extending annular transmission region for receiving a viscous fluid, via which the drive disc is couplable to the output body for transmitting a torque. Furthermore, the drive disc comprises an annular segment-shaped storage chamber for receiving the viscous fluid, wherein the transmission region fluidically connects to the storage chamber via an inlet path and via a drainage path. A closable valve opening for controlling the quantity of the viscous fluid in the transmission region is provided in the inlet path. According to the invention, the inlet path comprises an annular segment-shaped communication passage, which fluidically connects the storage chamber to the valve opening. Furthermore, the drainage path fluidically connects to the inlet path at the valve opening.

Deviating from conventional hydrodynamic friction clutches, the viscous fluid from the storage chamber and the viscous fluid from the transmission region according to the invention can be combined at the valve opening and conveyed back into the transmission region. In particular, a detour of the viscous fluid is avoided here, which conventionally is conveyed into the storage chamber and out of the storage chamber via the inlet path back into the transmission region. In the hydrodynamic friction clutch according to the invention, the storage chamber, in contrast with conventional hydrodynamic friction clutches, can drain completely and quickly as a result of which the dynamic regulation of the hydrodynamic friction clutch is improved and a faster engagement and disengagement of the output body achieved. Furthermore, the annular segment-shaped communication passage, with the hydrodynamic friction clutch disengaged, constitutes an obstacle for the viscous fluid so that the viscous fluid cannot enter the transmission region even in the case of an unfavourable angle of rotation position of the drive disc. By way of this, a co-rotating of the output body following a drive start of the hydrodynamic friction clutch that has been disengaged for an extended period of time and an energy consumption by the output body can be advantageously prevented.

With an advantageous further development of the hydrodynamic friction clutch it is provided that in a engaged mode the valve opening is open. The viscous fluid can then flow out of the transmission region through the drainage path to the valve opening and further through the inlet path back into the transmission region and the viscous fluid out of the storage chamber through the inlet path into the transmission region. In the engaged mode, the viscous fluid is almost completely conveyed into the transmission region. In the process, the viscous fluid flowing in from the transmission region via the drainage path because of a remaining slip—approximately 5%—is conveyed to the open valve opening and because of its low throttling back into the transmission region. The viscous fluid from the storage chamber is conveyed via the communication passage to the open valve opening and continues to flow with the viscous fluid from the drainage path into the transmission region. In the engaged mode, a maximum engagement of the hydrodynamic friction clutch and thereby the maximum transmission of the torque from the drive disc to the output body is achieved quickly and efficiently.

Advantageously it is additionally provided that in a disengaged mode the valve opening is closed. Here, the viscous fluid cannot flow through the drainage path from the transmission region into the communication passage and into the storage chamber and out of the storage chamber. In the disengaged mode, the fluid is almost completely conveyed into the storage chamber. In the process, the fluid, because of the closed valve opening, is not conveyed out of the storage chamber and the fluid from the transmission region is conveyed via the drainage path to the valve opening. Since the valve opening is closed, the fluid flows, from the valve opening, via the communication passage into the storage chamber. In the disengaged mode, a minimum engagement of the hydrodynamic friction clutch and thereby the minimum transmission of the rotational speed from the drive disc to the output body is quickly and efficiently reached. During the minimum transmission of the rotational speed, the output body merely rotates with a drag rotational speed or with a no-load rotational speed because of a remaining friction between the drive disc and the output body in the transmission region. The valve opening can be closed or opened for example by way of a valve lever.

In an advantageous further development of the hydrodynamic friction clutch according to the invention it is provided that the drainage path comprises a resistance body in the drive disc, which is formed on the transmission region located radially outside. Furthermore, the drainage path comprises a drainage bore in the drive disc which fluidically connects the resistance body to an outlet opening in the drive disc. At least one radially orientated pumping passage of the drainage path in the drive disc then fluidically connects the outlet opening and the valve opening. Advantageously, the viscous fluid can, in the engaged mode and in the disengaged mode, consecutively flow through the resistance body, the drainage bore, the outlet opening, the at least one pumping passage. The drainage path is thus formed on the primary side or drive side and the outlet of the viscous fluid from the transmission region is independent of the rotational speed of the output body.

In an alternative advantageous further development of the hydrodynamic friction clutch according to the invention it is provided that the drainage path comprises a resistance body in the output body, which is arranged on the transmission region located radially outside. Furthermore, the drainage path comprises a drainage bore in the output body, which fluidically connects the resistance body to an outlet opening in the output body. Furthermore, the drainage path comprises a drainage bore in the output body which fluidically connects the resistance body to an outlet opening in the output body. The outlet opening then leads into an annular segment-shaped and preferentially eccentric collection groove of the drainage path in the drive disc. In addition, the drainage path comprises at least one passage path in the drive disc which fluidically connects the collection groove and the valve opening. Advantageously, in the drainage path, the viscous fluid can consecutively flow through the resistance body, the drainage bore, the outlet opening, the collection groove and the passage path. Here, the drainage path is formed partly on the secondary side or on the output side and the outflow of the viscous fluid from the transmission region is dependent on the rotational speed of the output body.

In an advantageous configuration of the hydrodynamic friction clutch it is provided that the inlet path comprises an inlet bore which connects the valve opening to a zone of the transmission region located radially inside. In the engaged mode, the viscous fluid, in the inlet path, can consecutively flow through the storage chamber, the communication passage, the valve opening and the inlet bore. In the disengaged mode, the viscous fluid cannot flow through the inlet bore and the valve opening in the inlet path and can consecutively flow through the communication passage and the storage chamber.

Advantageously it can be provided that the annular segment-shaped storage chamber has an outer radius deviating in the circumferential direction, which continuously becomes smaller from a middle outlet region to lateral end regions. Here, the communication passage fluidically connects to the storage chamber in the outlet region. During the rotation of the drive disc, the viscous fluid is forced towards the outside and flows out of the end regions into the outlet region with the larger outer radius. The communication channel follows the outlet region so that during the rotation of the drive disc the viscous fluid can flow out of the storage chamber. Because of this, the viscous fluid, in the engaged mode, can be almost completely conveyed out of the storage chamber into the transmission region. In order to support emptying the storage chamber, an annular segment-shaped ventilation passage can follow at least one of the end regions of the storage chamber. By way of the ventilation passage, the pressure differential in the storage chamber can be equalised so that the viscous fluid in the engaged mode can almost completely flow out of the storage chamber. Advantageously it can be provided that at least one axial outer wall of the storage chamber is inclined from the outside towards the inside towards the shaft. By way of this, the emptying of the storage chamber can be supported.

In an advantageous configuration of the hydrodynamic friction clutch it is provided that the annular segment-shaped communication passage extends in the circumferential direction by an arc angle between 160° and 200°. Preferentially, the communication passage extends over an arc angle equal to 180°. In this advantageous manner, the valve opening and the storage chamber are decoupled from one another by the communication passage and with the hydrodynamic friction clutch disengaged, the fluid cannot enter the transmission space in any angle of rotation position of the drive disc. In an unfavourable angle of rotation position of the storage chamber, the communication passage links up with the storage chamber at the bottom—with respect to the gravitational force—and the fluid can flow out of the storage chamber into the communication passage under the effect of the gravitational force. Here, the valve opening is arranged twisted by 160° to 200° and consequently at the top so that the fluid cannot flow into the valve opening and remains in the communication passage. In an unfavourable angle of rotation position of the valve opening, the same is arranged at the bottom—with respect to the gravitational force—and the fluid can flow through the valve opening into the transmission region. However, since the communication space is linked to the storage chamber twisted by 160° to 200° and consequently at the top, the fluid from the storage chamber cannot enter the communication passage and remains in the storage chamber. Because of this, the output body, with the hydrodynamic friction clutch disengaged—or the internal combustion engine switched off—remains securely decoupled from the drive disc and an undesirable co-rotating of the output body following a drive start of the hydrodynamic friction clutch that has been disengaged for an extended period of time is advantageously prevented. Furthermore, an energy consumption by the output body and an undesirable noise development on the output body—on the motor vehicle fan—is minimised.

In summary, the dynamic regulation in the hydrodynamic friction clutch according to the invention can be improved and a faster engagement and disengagement of the output body achieved. Furthermore, the output body, in the hydrodynamic friction clutch according to the invention, can be decoupled from the drive disc even with an unfavourable angle of rotation position of the drive disc, so that a co-rotating of the output body following a drive start of the hydrodynamic friction clutch that has been disengaged for an extended period of time can be advantageously prevented.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows in each case schematically

DETAILED DESCRIPTION

Figure 1:
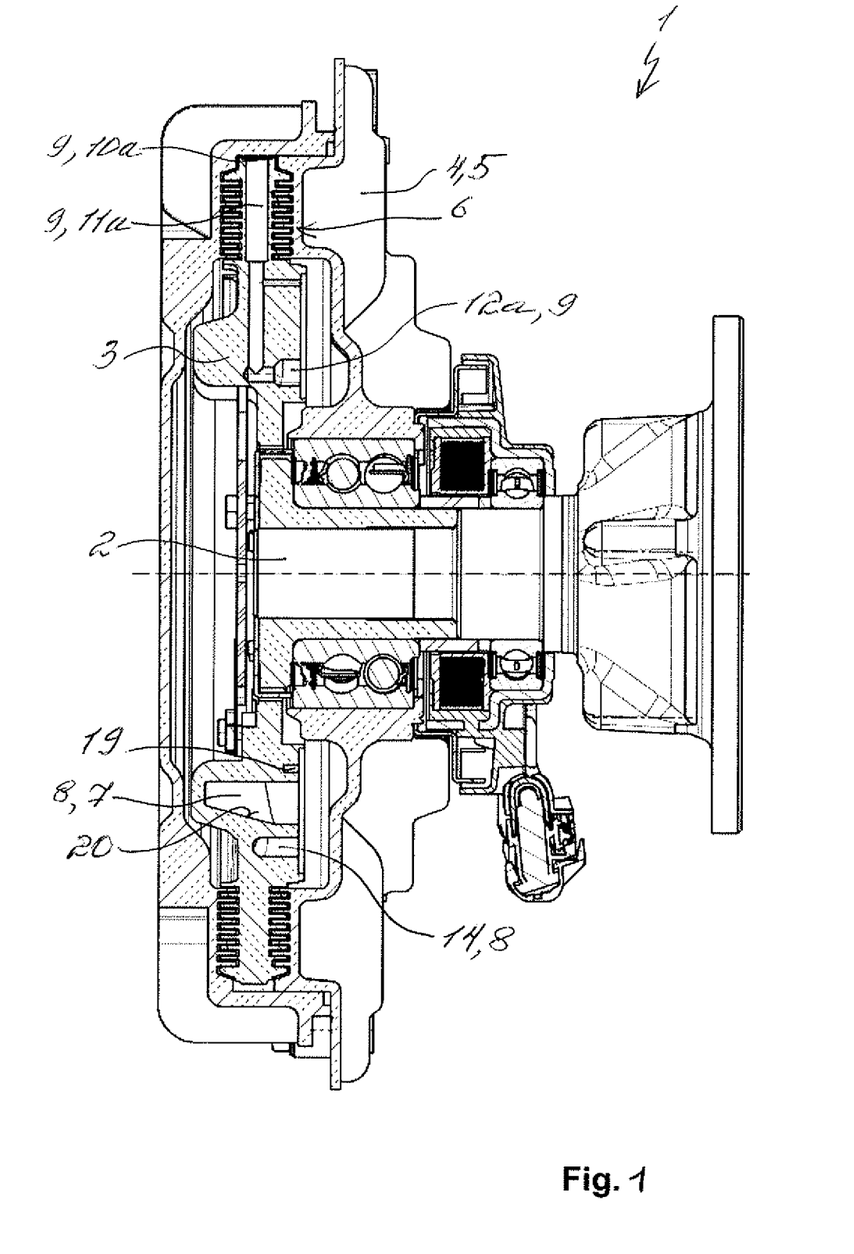
FIG. 1 a sectional view of a hydrodynamic friction clutch according to the invention in a first embodiment.
Figure 2:
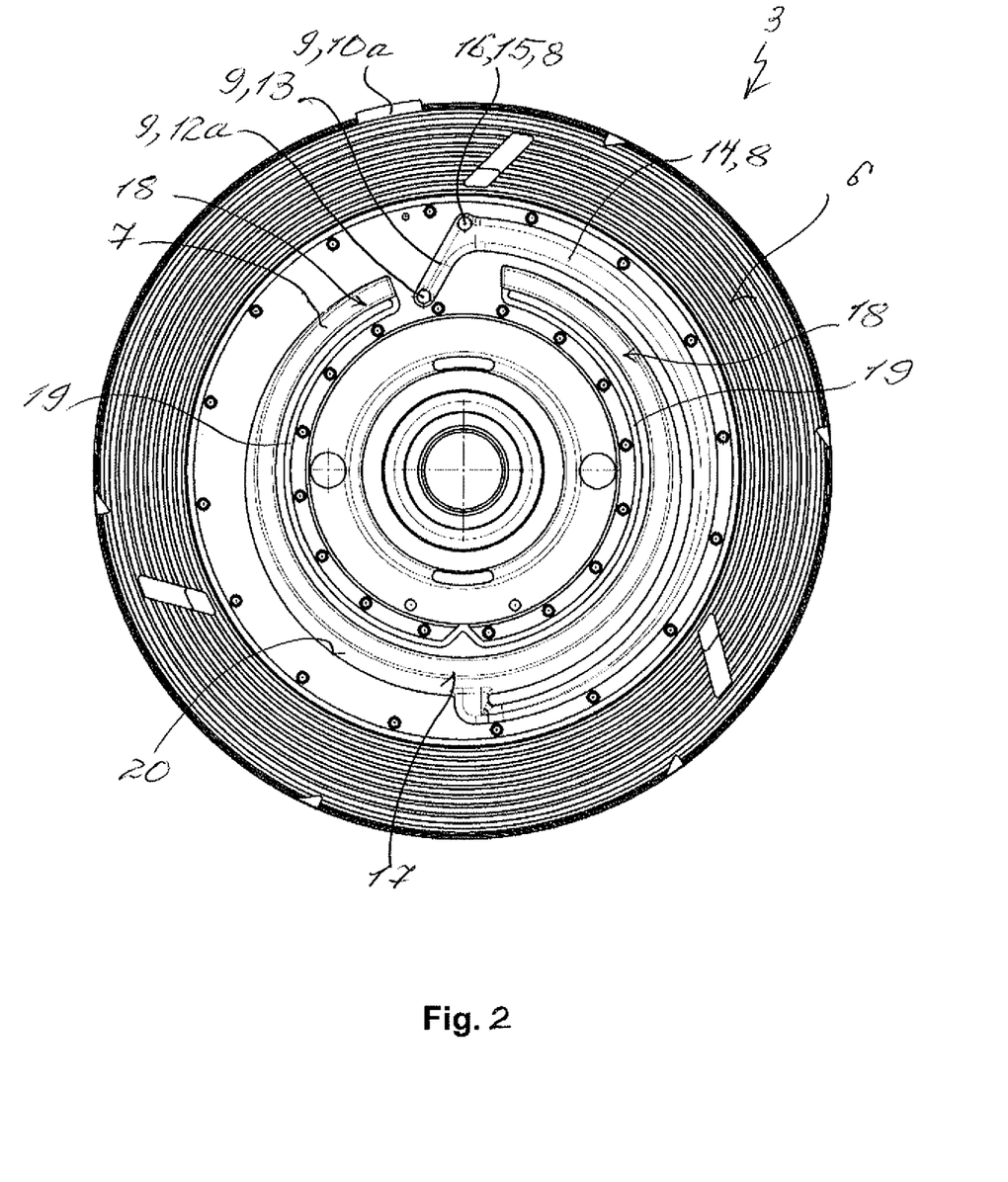
FIG. 2 a view of a drive disc in the hydrodynamic friction clutch in the first embodiment.

FIG. 1 shows a sectional view of a hydrodynamic friction clutch 1 according to the invention in a first embodiment. The hydrodynamic friction clutch 1 comprises a rotatably mounted shaft 2, on which a drive disc 3 is non-rotatably fixed and a drive body 4—in this exemplary embodiment a motor vehicle fan 5—is rotatably fixed. In FIG. 2, a view of the drive disc 3 is shown. Here, the drive disc 3 has a radially extending annular transmission region 6 for receiving a viscous fluid, via which the drive disc 3 is couplable to the drive body 4 for transmitting a torque. Furthermore, the drive disc 3 comprises an annular segment-shaped storage chamber 7 for receiving the viscous fluid, wherein the transmission region 6 is fluidically connected to the storage chamber 7 via an inlet path 8 and a drainage path 9.

The drainage path 9 of the hydrodynamic friction clutch 1 in the first embodiment is arranged on the primary side or drive side and comprises a resistance body 10a, a drainage bore 11a, an outlet opening 12a and a radially orientated pumping passage 13. The resistance body 10a is formed in the drive disc 3 located radially outside on the transmission region 6 and is fluidically connected to the outlet opening 12a via the drainage bore 11a in the drive disc 3. The pumping passage 13 in the drive disc 3 fluidically connects the outlet opening 12a to the inlet path 8. The inlet path 8 comprises the storage chamber 7 and an annular segment-shaped communication passage 14, which fluidically connects the storage chamber 7 to a closable valve opening 15. The drainage path 9 also leads into the inlet path 8 at the valve opening 15. Furthermore, the inlet path 8 comprises an inlet bore 16 which connects the valve opening 15 to a zone of the transmission region 6 located radially inside.

The hydrodynamic friction clutch 1 can be operated in a engaged mode and in a disengaged mode, as is explained in more detail in the following by way of FIG. 3 and FIG. 4. In the engaged mode, the viscous fluid, because of the centrifugal force acting on the fluid, consecutively flows in the inlet path 8 through the storage chamber 7, the communication passage 14, the valve opening 15 and the inlet bore 16. The fluid flows out of the storage chamber 7 into the transmission region 6. At a high rotational speed of the drive disc 3 and with a large radius difference between the storage chamber 7 and the valve opening 15, the storage chamber 7 can be emptied particularly quickly. In the drainage path 9, the viscous fluid consecutively flows through the resistance body 10a, the drainage bore 11a, the outlet opening 12a and the pumping passage 13. In the process, the viscous fluid flows out of the transmission region (6) because of a remaining slip via the drainage path 9 to the opened valve opening 15 of the inlet path 8 and because of a minor throttling of the valve opening 15, back into the transmission region 6. By way of this, the fluid from the storage chamber 7 is almost completely conveyed into the transmission region 6.

In the disengaged mode, the valve opening 15 is closed so that in the inlet path 8 the inlet bore 16 and the valve opening 15 are not flowed through. In the drainage path 9, the viscous fluid continues to consecutively flow through the resistance body 10a, the drainage bore 11a, the outlet opening 12a and the pumping passage 13. Since however the valve opening 15 is closed, the fluid after the pumping passage 13 flows in the inlet path 8 into the communication passage 14 and further into the storage chamber 7. Because of this, the fluid, in the drainage mode, can be conveyed almost completely out of the transmission space 6 into the storage chamber 7. In the hydrodynamic friction clutch 1, the storage chamber 7 and the transmission region 6 can be advantageously emptied completely and quickly in contrast with conventional hydrodynamic friction clutches, as a result of which the dynamic regulation of the hydrodynamic friction clutch 1 is improved and a quicker engagement and disengagement of the output body 4 can be achieved.

In addition, the annular segment-shaped storage chamber 7 has an outer radius that deviates in the circumferential direction, which from a middle outlet region 17 becomes continuously smaller towards lateral end regions 18. The communication passage 14 fluidically connects to the storage chamber 7 in the outlet region 17. When the drive disc 3 is rotated, the viscous fluid is thereby forced out of the end regions 18 to the outlet region 17 so that the emptying of the storage chamber 7 is supported in the engaged mode. In addition, an outer wall 20 of the storage chamber 7 is inclined towards the shaft 2 so that a drainage of the fluid to the communication passage 14 is supported. By way of the annular segment-shaped ventilation passages 19 linking up to the end regions 18, the pressure differential during the emptying of the storage chamber 7 can be additionally equalised.

Furthermore, the communication passage 14 which extends by 180° in the circumferential direction constitutes an obstacle for the viscous fluid with the non-driven hydrodynamic friction clutch 1 in the friction clutch 1 according to the invention, so that the viscous fluid cannot enter the transmission region 6 even with an unfavourable angle of rotation position of the drive disc 3.

In an unfavourable angle of rotation position of the storage chamber 7 according to FIG. 2, the outlet region 17 of the storage chamber 7 lies at the bottom and the fluid can flow out of the storage chamber 7 into the communication passage 14 under the effect of the gravitational force. Here, the valve opening 15 is twisted by 180° relative to the outlet region 17 thereby arranged at the top. Consequently the fluid cannot enter the valve opening 15 and remains in the communication passage 14. In an unfavourable angle of rotation position of the valve opening 15, the same is arranged at the bottom and the fluid can flow through the valve opening 15 into the transmission region 6. Since however the outlet region 17 of the connection space 7 lies twisted by 180° and consequently at the top, the fluid from the storage chamber 7 cannot reach the communication passage 14 and consequently not enter the valve opening 15. Because of this, the drive body 4, with the non-driven hydrodynamic friction clutch 1, remains securely decoupled from the drive disc 3 and an undesirable co-rotating of the output body 4 after a drive start of the hydrodynamic friction clutch 1 that has been disengaged for an extended period of time is advantageously prevented.

Figure 3:
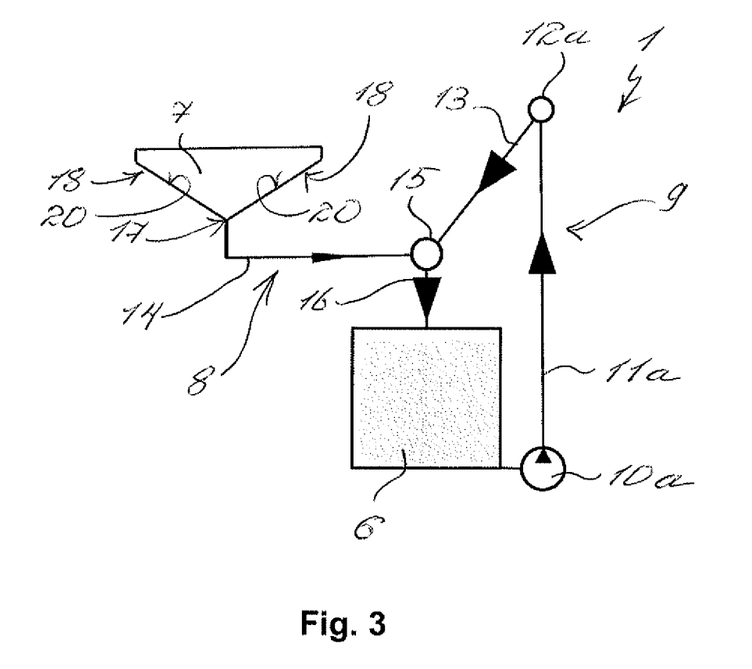
FIG. 3 a hydraulic diagram of the hydrodynamic friction clutch in the first embodiment in a engaged mode.
Figure 4:
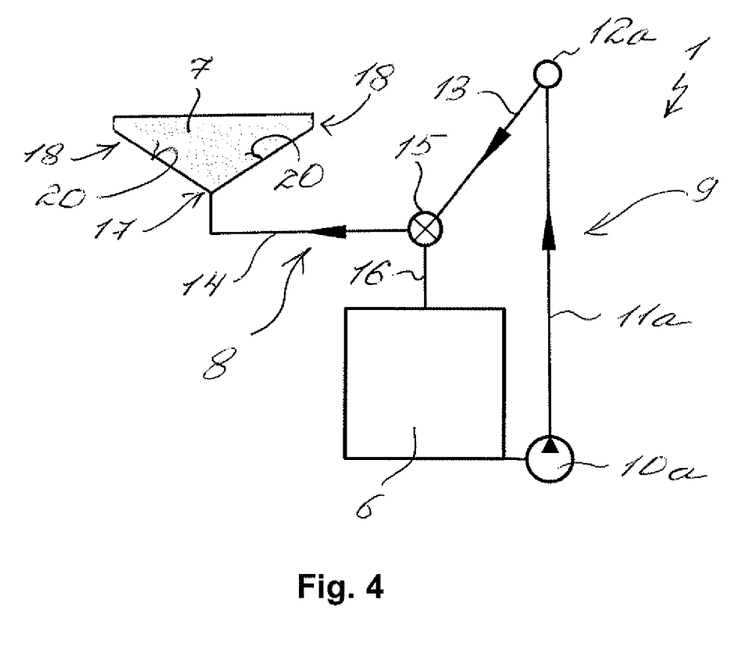
FIG. 4 a hydraulic diagram of the hydrodynamic friction clutch in the first embodiment in a disengaged mode.

FIG. 3 and FIG. 4 show hydraulic diagrams of the hydrodynamic friction clutch 1 in the first embodiment in the engaged mode and in the disengaged mode. In the hydraulic diagram shown here, a rotating system was analogously transformed into a non-rotating system wherein the centrifugal force of the rotating system was figuratively replaced with the gravitational force. In FIG. 3, the hydrodynamic friction clutch 1 is in the engaged mode and the fluid is nearly completely conveyed out of the storage chamber 7 into the transmission region 6. In the process, the storage chamber 7, the communication channel 14, the valve opening 15 and the inlet bore 16 are consecutively flowed through in the inlet path 8. The drainage path 9 links up at the opened valve opening 15 with the inlet path 8, so that the fluid from the transmission region 6 flows back into transmission region 6. The storage chamber 7, furthermore, is configured funnel-shaped through the deviating outer radius, so that the emptying of the storage chamber 7 is additionally supported. In FIG. 4, the hydrodynamic friction clutch 1 is in the disengaged mode and the fluid is nearly completely conveyed into the storage chamber 7. Here, the valve opening 15 is closed so that in the inlet path 8 the inlet bore 16 and the valve opening 15 are not flowed through. In the drainage path 9, the resistance body 10a, the drainage bore 11a, the outlet opening 12a and the pumping passage 13 continue to be consecutively flowed through. Since the valve opening 15 is closed, the fluid, after the pumping passage 13, flows in the inlet path 8 into the communication passage 14 and on into the storage chamber 7.

Figure 5:
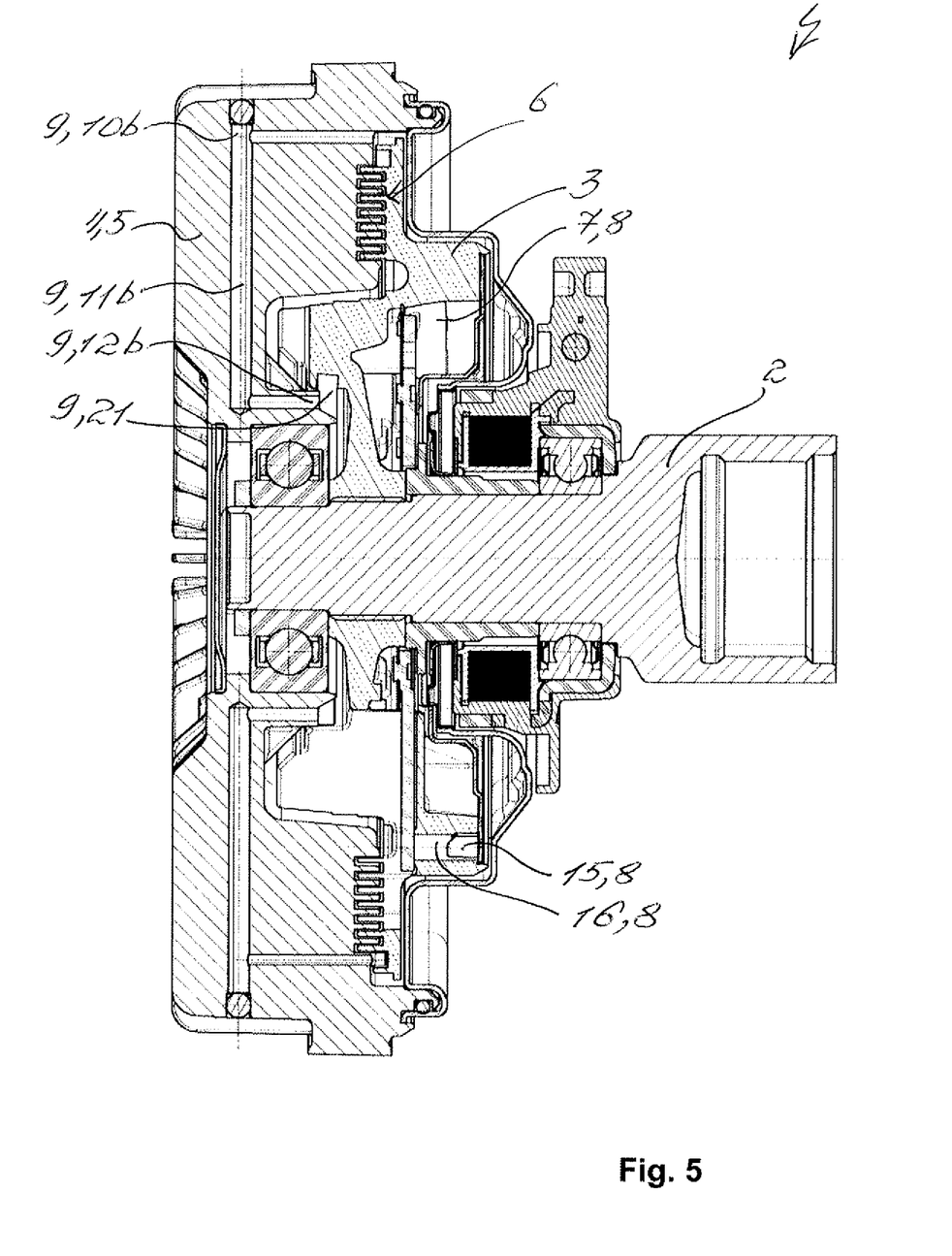
FIG. 5 a sectional view of a hydrodynamic friction clutch according to the invention in a second embodiment.
Figure 6:
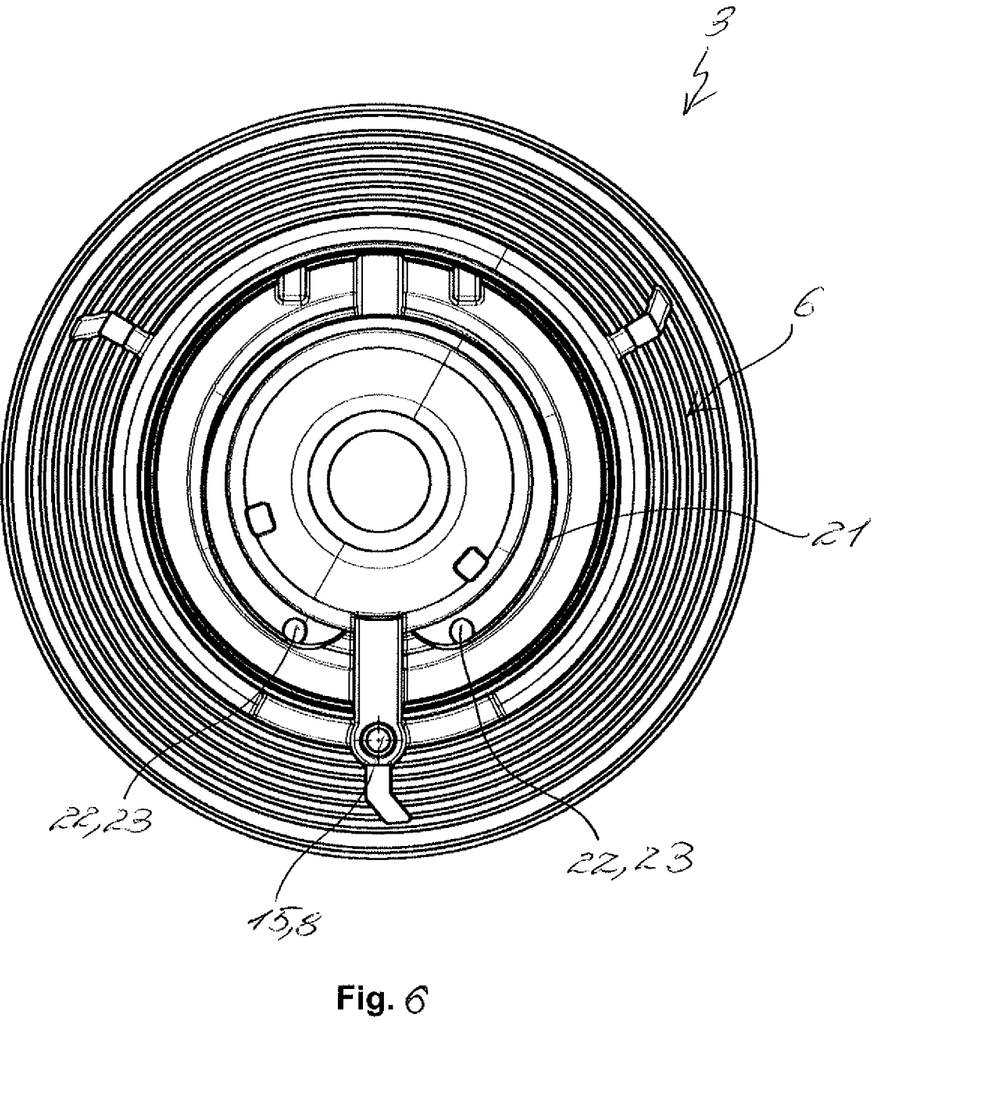
FIGS. 6 and 7 views of a drive disc in the hydrodynamic friction clutch in the second embodiment.
Figure 7:
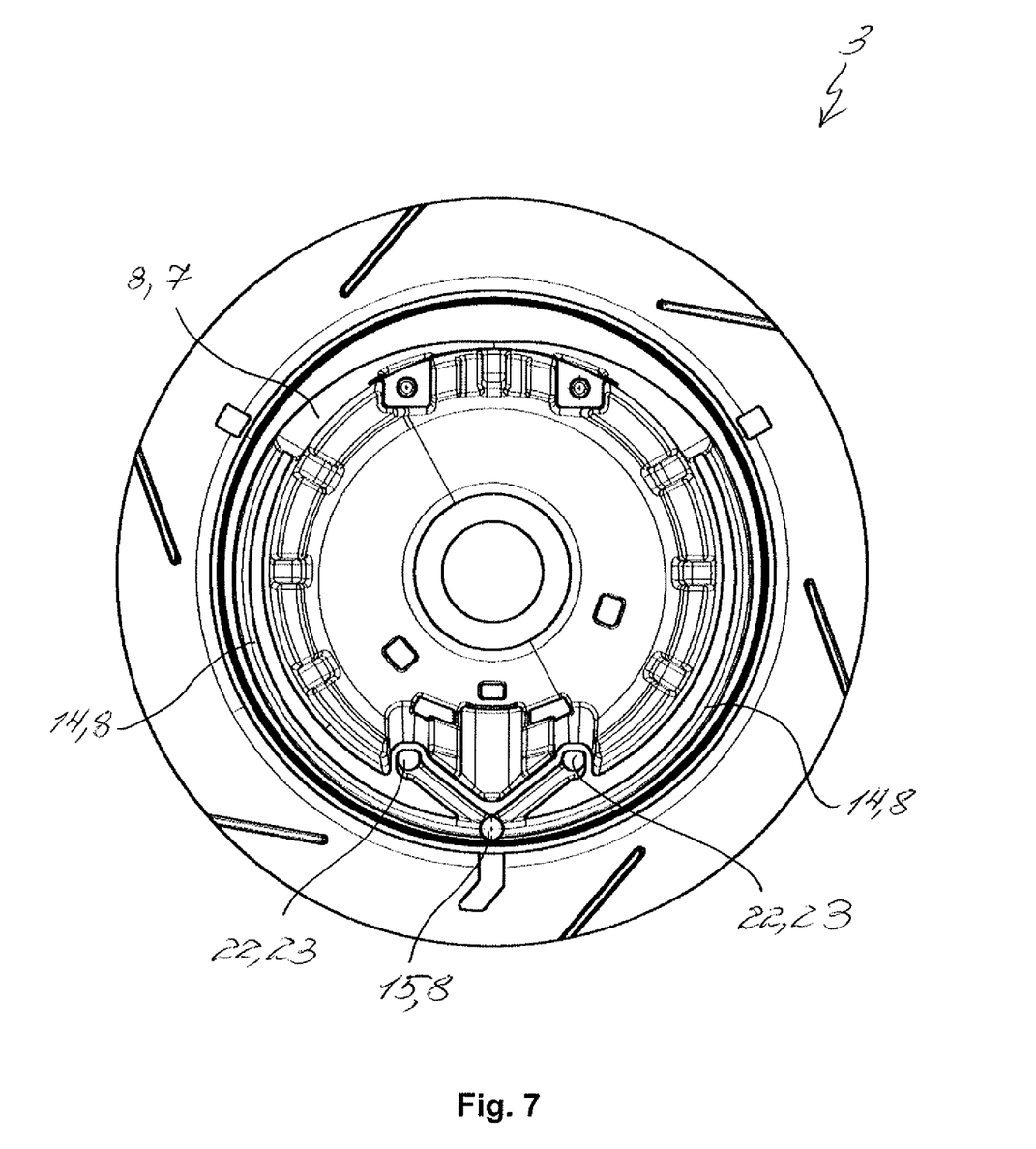
Figure 8:
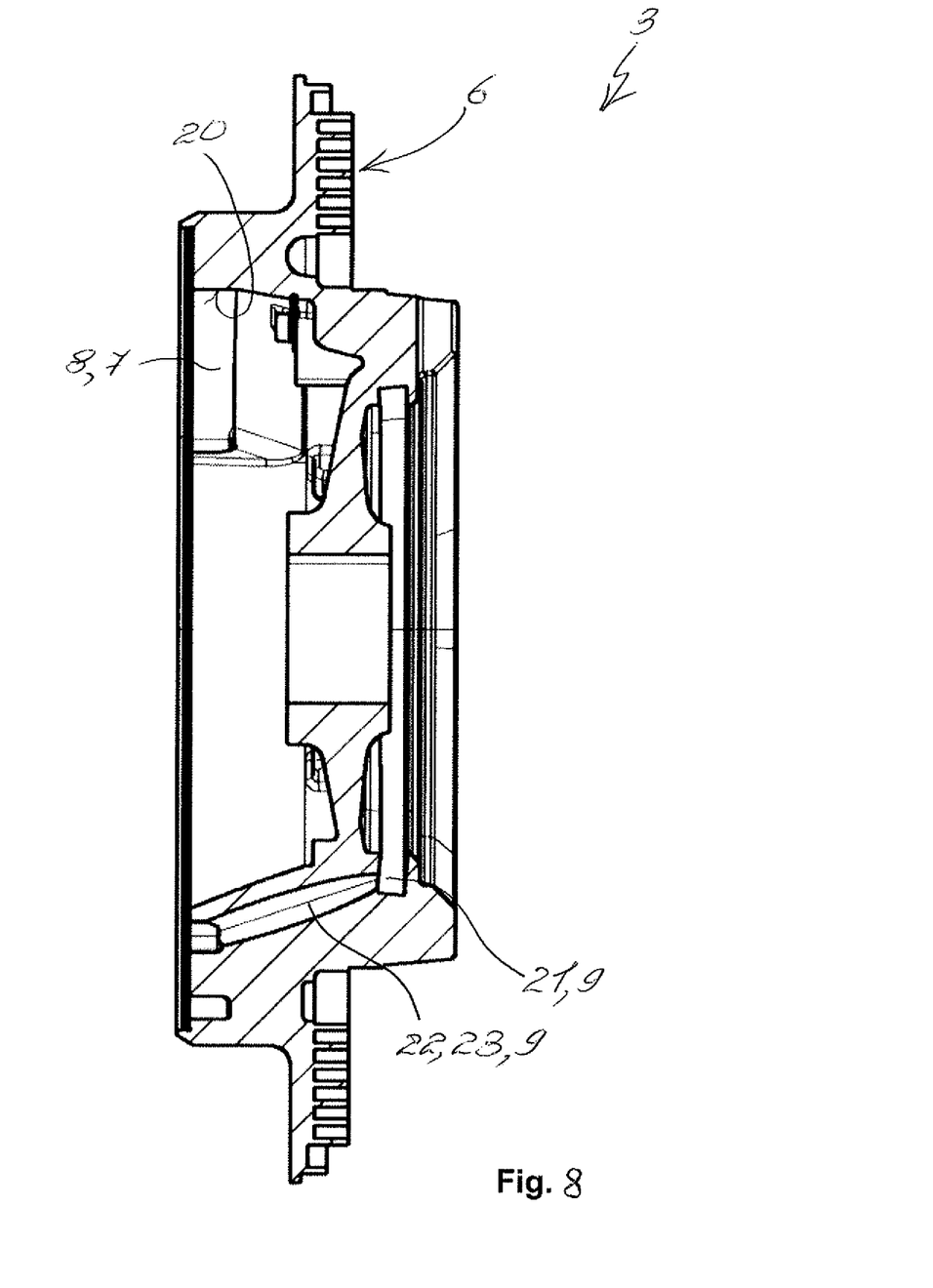
FIG. 8 a sectional view of a drive disc in the hydrodynamic friction clutch in the second embodiment.

FIG. 5 shows a sectional view of the hydrodynamic friction clutch 1 according to the invention in a second embodiment. FIG. 6 and FIG. 7 show views and FIG. 8 shows a sectional view of the drive disc 3 of the hydrodynamic friction clutch 1 in the second embodiment. Deviating from the hydrodynamic friction clutch 1 in FIG. 1 to FIG. 4, the drainage path 9 in this case is arranged partly on the secondary side or on the drive side. Here, the drainage path 9 comprises the resistance body 10b, the drainage bore 11b and the outlet opening 12b which are formed in the output body 4 on the secondary side. Furthermore, the drainage path 9 comprises an annular segment-shaped eccentric collection groove 21 and a passage path 22, which are formed in the drive disc 3 on the primary side. The outlet opening 12b leads into the collection groove 21 which is fluidically connected to the valve opening 15 by two passages 23 of the passage path 22. The hydrodynamic friction clutch 1 in the second embodiment otherwise corresponds to the hydrodynamic friction clutch 1 in the first embodiment.

The choice of the embodiment of the hydrodynamic friction clutch 1 depends on the maximum rotational speed of the driveshaft 3. In principle it should be noted that up to approximately 4,000 revolutions per minute the first embodiment and from approximately 4,000 revolutions per minute the second embodiment are advantageous. The reason for this distinction is the difference of the stagnation pressure in the drainage path 9, which at higher rotational speeds of the drive disc 3 can no longer overcome the difference of the pressure in the inlet path 8 generated by the centrifugal force. Since the rotational speed of the drive body 4—and in particular of the motor vehicle fan 5—does not usually exceed 4,000 revolutions per minute, the drainage path 9 at the maximum rotational speed of the drive disc 3 above approximately 4,000 revolutions per minute can be arranged on the secondary side.

Figure 9:
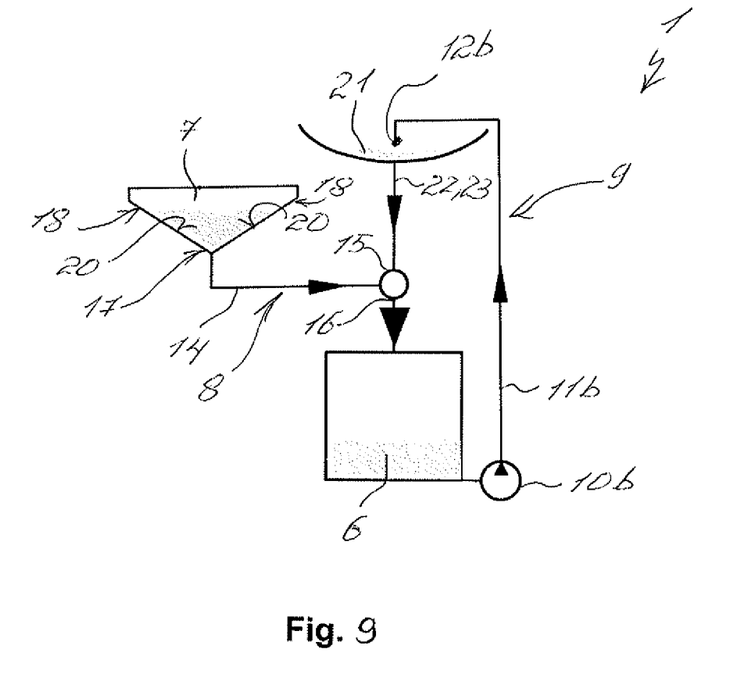
FIG. 9 a hydraulic diagram of the hydrodynamic friction clutch in the second embodiment in a engaged mode.
Figure 10:
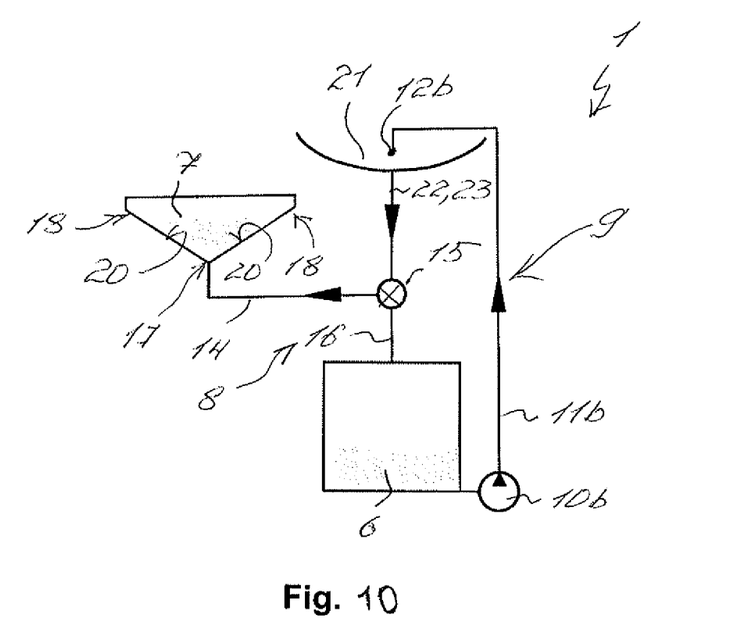
FIG. 10 a hydraulic diagram of the hydrodynamic friction clutch in the second embodiment in a disengaged mode.

FIG. 9 and FIG. 10 show hydraulic diagrams of the hydrodynamic friction clutch 1 in the second embodiment in the engaged mode and in the disengaged mode. In the hydraulic diagrams shown here, a rotating system was analogously transformed into a non-rotating system, wherein the centrifugal force of the rotating system was figuratively replaced with the gravitational force. In FIG. 9, the hydrodynamic friction clutch 1 is in the engaged mode and the fluid is conveyed out of the storage chamber 7 into the transmission region 6. Here, the storage chamber 7, the communication passage 14, the valve opening 15 and the inlet bore 16 are consecutively flowed through in the inlet path 8. The storage chamber 7 is additionally configured funnel-like through the deviating outer radius, which additionally supports the emptying of the storage chamber 7. In the drainage path 9, the fluid flows out of the transmission region 6 via the resistance body 10b, the drainage bore 11b and the outlet opening 12b initially into the collection groove 21. From the collection groove 21, the fluid is conveyed via the passage path 22 to the valve opening 15 so that the fluid from the transmission region 6 flows back into the transmission region 6. In FIG. 10, the hydrodynamic friction clutch 1 is in the disengaged mode and the fluid is conveyed out of the transmission region 6 into the storage chamber 7. Here, the valve opening 15 is closed so that in the inlet path 8 the inlet bore 16 and the valve opening 15 are not flowed through. In the drainage path 9, the resistance body 10b, the drainage bore 11b, the outlet opening 12b, the collection groove 21 and the passage path 22 are consecutively flowed through. Since the valve opening 15 is closed, the fluid, after the passage path 22 in the inlet path 8 flows into the communication passage 14 and on into the storage chamber 7.

In summary, the dynamic regulation in the hydrodynamic friction clutch 1 according to the invention can be improved and a quicker engagement and disengagement of the output body 4 achieved. Furthermore, the output body 4 can be decoupled from the drive disc 3 in the hydrodynamic friction clutch 1 according to the invention even with an unfavourable angle of rotation position of the drive disc 3, so that a co-rotating of the output body 4 after a drive start of the hydrodynamic friction clutch 1 which has been disengaged for an extended period of time can be advantageously prevented.

The invention claimed is:

1. A hydrodynamic friction clutch, comprising:
a rotatably mounted shaft;
a drive disc non-rotatably fixed on the shaft; and
an output body rotatably fixed on the shaft;
wherein the drive disc includes a radially extending annular transmission region for receiving a viscous fluid and via which the drive disc is couplable to the output body for transmitting a torque;
wherein the drive disc includes an annular segment-shaped storage chamber for receiving the viscous fluid;
wherein the transmission region is fluidically connected to the storage chamber via an inlet path and via a drainage path;
wherein, in the inlet path, a closable valve opening for controlling the quantity of the viscous fluid in the transmission region is provided;
wherein the inlet path includes an annular segment-shaped communication passage, which fluidically connects the storage chamber to the valve opening;
wherein the drainage path fluidically connects to the inlet path at the valve opening; and
wherein the inlet path includes an inlet bore which connects the valve opening to a zone of the transmission region.

2. The hydrodynamic friction clutch according to claim 1, wherein:
the drainage path includes at least one radially orientated pumping passage in the drive disc, which fluidically connects an outlet opening in the drive disc and the valve opening.

3. The hydrodynamic friction clutch according to claim 2, wherein:
in an engaged mode, the valve opening is open, wherein the viscous fluid is flowable from the transmission region through the drainage path to the valve opening and further through the inlet path back into the transmission region, and wherein the viscous fluid is flowable out of the storage chamber through the inlet path into the transmission region; and
in a disengaged mode, the valve opening is closed, wherein the viscous fluid is flowable through the drainage path out of the transmission region into the communication passage and into the storage chamber and is not flowable out of the storage chamber.

4. The hydrodynamic friction clutch according to claim 2, wherein, in the drainage path, the viscous fluid is consecutively flowable through the outlet opening and the at least one pumping passage in an engaged mode and in a disengaged mode.

5. The hydrodynamic friction clutch according to claim 1, wherein:
the drainage path includes an annular segment-shaped collection groove in the drive disc, into which the outlet opening leads; and
the drainage path includes at least one passage path in the drive disc, which fluidically connects the collection groove and the valve opening.

6. The hydrodynamic friction clutch according to claim 5, wherein the collection groove is eccentric.

7. The hydrodynamic friction clutch according to claim 5, wherein, in the drainage path, the viscous fluid, in an engaged mode and in a disengaged mode, is consecutively flowable through the outlet opening, the collection groove, and the passage path.

8. The hydrodynamic friction clutch according to claim 1, wherein:
in an engaged mode in the inlet path, the viscous fluid is consecutively flowable through the storage chamber, the communication passage, the valve opening, and the inlet bore; and
in a disengaged mode in the inlet path, the viscous fluid is not flowable through the inlet bore and the valve opening, and is consecutively flowable through the communication passage and the storage chamber.

9. The hydrodynamic friction clutch according to claim 1, wherein:
the annular segment-shaped storage chamber has an outer radius deviating in the circumferential direction, which from a middle outlet region continuously decreases towards lateral end regions; and
the communication passage fluidically connects to the storage chamber in the outlet region.

10. The hydrodynamic friction clutch according to claim 9, wherein an annular segment-shaped ventilation passage connects at least at one of the end regions of the storage chamber.

11. The hydrodynamic friction clutch according to claim 1, wherein the annular segment-shaped communication passage extends in the circumferential direction by an arc angle between 160° and 200°.

12. The hydrodynamic friction clutch according to claim 1, wherein at least one axial outer wall of the storage chamber is inclined towards the shaft from the outside to the inside.

13. A hydrodynamic friction clutch, comprising:
a rotatably mounted shaft;
a drive disc non-rotatably fixed on the shaft; and
an output body rotatably fixed on the shaft;
wherein the drive disc includes a radially extending annular transmission region for receiving a viscous fluid and via which the drive disc is couplable to the output body for transmitting a torque;
wherein the drive disc includes an annular segment-shaped storage chamber for receiving the viscous fluid;
wherein the transmission region is fluidically connected to the storage chamber via an inlet path and via a drainage path;
wherein, in the inlet path, a closable valve opening for controlling the quantity of the viscous fluid in the transmission region is provided;
wherein the inlet path includes an annular segment-shaped communication passage, which fluidically connects the storage chamber to the valve opening;
wherein the drainage path fluidically connects to the inlet path at the valve opening;

wherein, in an engaged mode, the valve opening is open, wherein the viscous fluid is flowable from the transmission region through the drainage path to the valve opening and further through the inlet path back into the transmission region, and wherein the viscous fluid is flowable out of the storage chamber through the inlet path into the transmission region;

wherein, in a disengaged mode, the valve opening is closed, wherein the viscous fluid is flowable through the drainage path out of the transmission region into the communication passage and into the storage chamber and is not flowable out of the storage chamber; and wherein the inlet path includes an inlet bore which connects the valve opening to a zone of the transmission region.

14. The hydrodynamic friction clutch according to claim 13, wherein:

the drainage path includes at least one radially orientated pumping passage in the drive disc, which fluidically connects an outlet opening in the drive disc and the valve opening.

15. The hydrodynamic friction clutch according to claim 14, wherein, in the drainage path, the viscous fluid is consecutively flowable through the outlet opening and the at least one pumping passage in the engaged mode and in the disengaged mode.

16. The hydrodynamic friction clutch according to claim 13, wherein:

the drainage path includes an annular segment-shaped collection groove in the drive disc, into which the outlet opening leads; and the drainage path includes at least one passage path in the drive disc, which fluidically connects the collection groove and the valve opening.

17. The hydrodynamic friction clutch according to claim 16, wherein, in the drainage path, the viscous fluid, in the engaged mode and in the disengaged mode, is consecutively flowable through the outlet opening, the collection groove, and the passage path.

18. The hydrodynamic friction clutch according to claim 13, wherein:

in the engaged mode in the inlet path, the viscous fluid is consecutively flowable through the storage chamber, the communication passage, the valve opening, and the inlet bore; and in the disengaged mode in the inlet path, the viscous fluid is not flowable through the inlet bore and the valve opening, and is consecutively flowable through the communication passage and the storage chamber.

19. A hydrodynamic friction clutch, comprising:

a rotatably mounted shaft;

a drive disc non-rotatably fixed on the shaft; and an output body rotatably fixed on the shaft;

wherein the drive disc includes a radially extending annular transmission region for receiving a viscous fluid and via which the drive disc is couplable to the output body for transmitting a torque;

wherein the drive disc includes an annular segment-shaped storage chamber for receiving the viscous fluid;

wherein the transmission region is fluidically connected to the storage chamber via an inlet path and via a drainage path;

wherein, in the inlet path, a closable valve opening for controlling the quantity of the viscous fluid in the transmission region is provided;

wherein the inlet path includes an annular segment-shaped communication passage, which fluidically connects the storage chamber to the valve opening;

wherein the drainage path fluidically connects to the inlet path at the valve opening; and wherein the annular segment-shaped storage chamber has an outer radius deviating in the circumferential direction, which from a middle outlet region continuously decreases towards lateral end regions, and the communication passage fluidically connects to the storage chamber in the outlet region.

* * * * *